(12) United States Patent
Iizuka

(10) Patent No.: US 6,426,824 B2
(45) Date of Patent: Jul. 30, 2002

(54) SCANNING OPTICAL SYSTEM

(75) Inventor: Takashi Iizuka, Saitama-ken (JP)

(73) Assignee: Asahi Kogaku Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/897,146

(22) Filed: Jul. 3, 2001

(30) Foreign Application Priority Data

Jul. 4, 2000 (JP) ........................................ 2000-202264

(51) Int. Cl.$^7$ .............................................. G02B 26/08
(52) U.S. Cl. ........................................ 359/205; 359/216
(58) Field of Search ................................ 359/205–207, 359/216–219; 347/258–261; 358/474, 481

(56) References Cited

U.S. PATENT DOCUMENTS

| | | |
|---|---|---|
| 4,993,792 A | 2/1991 | Minoura |
| 5,107,364 A | 4/1992 | Mirimoto et al. |
| 5,648,865 A | 7/1997 | Iizuka |
| 5,712,719 A * | 1/1998 | Hama ........................ 359/216 |
| 5,777,774 A | 7/1998 | Iizuka |
| 5,825,403 A | 10/1998 | Lima et al. |

FOREIGN PATENT DOCUMENTS

JP 3-5562 4/1983

* cited by examiner

Primary Examiner—James Phan
(74) Attorney, Agent, or Firm—Greenblum & Bernstein, P.L.C.

(57) ABSTRACT

A scanning optical system for scanning a light beam on an object surface in a main scanning direction is provided. The scanning optical system includes a light source, a polygonal mirror, and an optical system for focusing the light beam deflected by the polygonal mirror on the object surface. The rotation axis of the polygonal mirror is inclined with respect to an auxiliary scanning direction, which is perpendicular to the main scanning direction, to displace the beam spot in the auxiliary scanning direction. The light beam incident on the reflecting surface is also inclined with respect to a main scanning plane, which is parallel to the main scanning direction and includes an optical axis of the optical system, to displace the beam spot in the same auxiliary scanning direction that the beam spot is displaced due to the inclination of the rotation axis.

9 Claims, 5 Drawing Sheets

SCANNING OPTICAL SYSTEM

BACKGROUND OF THE INVENTION

The present invention relates to a scanning optical system, and more particularly, to a scanning optical system utilizing a rotating polygonal mirror for deflecting a light beam onto an object surface to be scanned.

Generally, a scanning optical system utilized in a laser imaging device, such as a laser photo-plotter, includes a laser source, a rotating polygonal mirror for deflecting the laser beam emitted from the laser source, and an fθ lens system or imaging optical system, which is arranged between the polygonal mirror and an object surface, for converging the laser beam deflected by the polygonal mirror on the object surface. The polygonal mirror is provided with a plurality of reflecting surfaces and is rotated about a rotation axis at a constant angular velocity. The laser beam is deflected by each reflecting surface, transmitted through the fθ lens system, and converged by the fθ lens system to form a beam spot on the object surface. The beam spot moves on the object surface in a main scanning direction at a constant velocity as the polygonal mirror rotates.

Generally, the polygonal mirror is arranged such that its rotation axis is perpendicular to a main scanning plane, which is parallel to the main scanning direction and includes the optical axis of the fθ lens system. The laser beam emitted from the laser source, impinges on a reflecting surface of the polygonal mirror along the main scanning plane.

It is well known that, in the scanning optical systems as mentioned above, a ghost image of a very low intensity appears on the object surface when the laser beam scans thereon. Such a ghost image appears since a part of the light of the beam spot is scattered and reflected by the object surface, transmitted through the fθ lens system, reflected by another reflecting surface (i.e., a surface next to the one contributing to the beam spot) of the polygonal mirror, and impinges on the object surface after being transmitted through the fθ lens again.

Although the intensity is relatively low, the ghost image still degrades the quality of the image formed on the object surface since it stays at a substantially fixed location on the object surface, and supplies sufficient amount of light for exposure.

Japanese patent publication of examined application HEI 3-5562 discloses a scanning optical system that prevents the ghost image from appearing on the object surface. The scanning optical system according to the above mentioned publication determines the angle between the laser beam, which proceeds along the main scanning plane and impinges on the reflecting surface of the polygonal mirror, and the optical axis of the imaging optical system. The angle is determined such that the ghost image is positioned out of a scanning area where the laser beam is to be scanned based on an equation which defines the angle as a function of the number of the reflecting surfaces of the polygonal mirror, the scanning width on the object surface, and the focal length of the imaging optical system.

However, according to the equation indicated in the publication HEI 3-5562, the angle between the laser beam and the optical axis of the imaging optical system is in inverse proportion to the number of the reflecting surfaces of the polygonal mirror. Therefore, the angle becomes quite small if the number of the reflecting surfaces is increased in order to increase the scanning speed. Accordingly, it is difficult to produce the conventional scanning optical system when the number of reflecting surfaces is too large such that the laser beam incident on the polygonal mirror overlaps the scanning area of the laser beam deflected by the polygonal mirror.

HEI 3-5562 also discloses a scanning optical system that prevents the ghost image from appearing on the object surface by inclining the laser beam incident on the polygonal mirror with respect to the main scanning plane. The scanning optical system is provided with a lens system that consists of lenses having rotationally symmetrical surfaces with respect to the optical axis. The laser beam incident on the polygonal mirror is inclined with respect to the main scanning plane, without changing the position on the reflecting surface on which the laser beam impinges, such that the ghost image appears on the object surface apart from a scan line in the auxiliary scanning direction. Here, the scan line is a line along which a beam spot, formed by the laser beam on the object surface, moves. The ghost image is prevented from appearing on the object surface by arranging a light intercepting member on the passage of light that forms the ghost image on the object surface.

The scan line, however, bows by the above mentioned scanning optical system due to the inclination of the laser beam incident on the polygonal mirror. Such bowing of the scan line are undesirable since it significantly degrades the quality of the image formed on the object surface.

SUMMARY OF THE INVENTION

It is therefore an object of the present invention to provide an improved scanning optical system that prevents degradation of an image formed on the object surface due to a ghost image even when the polygonal mirror has a large number of reflecting surfaces, without having a scan line bow.

For the above object, according to one aspect of the present invention, there is provided a scanning optical system for scanning a light beam on an object surface in a main scanning direction, which includes a light source, a polygonal mirror, and a scanning lens system.

The polygonal mirror has a plurality of reflecting surfaces that are arranged parallel to a rotation axis about which the polygonal mirror rotates. The reflecting surfaces deflects a light beam emitted form the light source toward the object surface to scan the light beam in the main scanning direction as the polygonal mirror rotates. The scanning lens system converges the light beam deflected by the reflecting surfaces on the object surface to form a beam spot thereon. A focal length of said scanning lens system in a main scanning direction is the same as a focal length of the scanning lens system in an auxiliary scanning direction. The auxiliary scanning direction is a direction perpendicular to both the main scanning direction and an optical axis of the scanning lens system.

A projection of the light beam incident on the reflecting surfaces onto an auxiliary scanning plane, which is perpendicular to the main scanning direction, inclines against the optical axis in a first direction. Further, a projection of the rotation axis of the polygonal mirror onto the auxiliary scanning plane inclines against the auxiliary direction in a second direction which is opposite to the first direction.

By the scanning optical system constituted as above, the light, reflected by the object surface at the beam spot, is incident on the reflecting surface of the polygonal mirror not perpendicularly but inclined in the auxiliary direction. Due to the inclination, the light is reflected by the reflecting surface toward the object surface and impinges on the object surface at a location apart from the beam spot in the auxiliary direction. Thus, the scanning optical system can separate the ghost image from the beam spot in the auxiliary direction.

Further, a bow of a scan line, along which the beam spot moves as the polygonal mirror rotates, can be reduced since a bow due to the inclination of the light beam incident on the reflecting surface of the polygonal mirror and a bow due to the inclination of the rotation axis of the polygonal mirror occur in opposite directions and cancels each other.

According to another aspect of the invention, the scanning optical system may be configured such that a projection of the light beam incident on the reflecting surfaces onto an auxiliary scanning plane, which is perpendicular to the main scanning direction, and a projection of the rotation axis of the polygonal mirror onto the auxiliary scanning plane are inclined, respectively, against the optical axis and a auxiliary direction such that a part of a light of the beam spot is reflected by the object surface, further reflected by the reflecting surface back to the object surface, and forms a ghost image on the object surface on the opposite side, with respect to the optical axis of the scanning lens system, to the side the beam spot is formed.

According to another aspect of the invention, the scanning optical system may be configured such that the rotation axis is inclined with respect to the auxiliary scanning direction to displace the beam spot in the auxiliary scanning direction, and the light beam incident on one of the reflecting surfaces is inclined with respect to a main scanning plane to displace the beam in a direction, along said auxiliary scanning direction, which is the same as a direction in which the beam spot is displaced due to the inclination of the rotation axis, the main scanning plane is parallel to the main scanning direction and including the optical axis of said scanning lens system.

In each aspect mentioned above, a light intercepting member may be provided on a passage of a light forming a ghost image on the object surface, but out of a passage of the light beam forming the beam spot on the object surface.

It is preferable that the light beam incident on the reflecting surface and the rotation axis of the polygonal mirror are inclined, respectively, such that a bow of a scan line, along which the light beam moves as the polygonal mirror rotates, caused by the inclination of the rotation axis of the polygonal mirror is canceled by a bow of the scan line caused by the inclination of the light beam incident on the reflecting surface.

BRIEF DESCRIPTION OF THE ACCOMPANYING DRAWINGS

Figure 1:
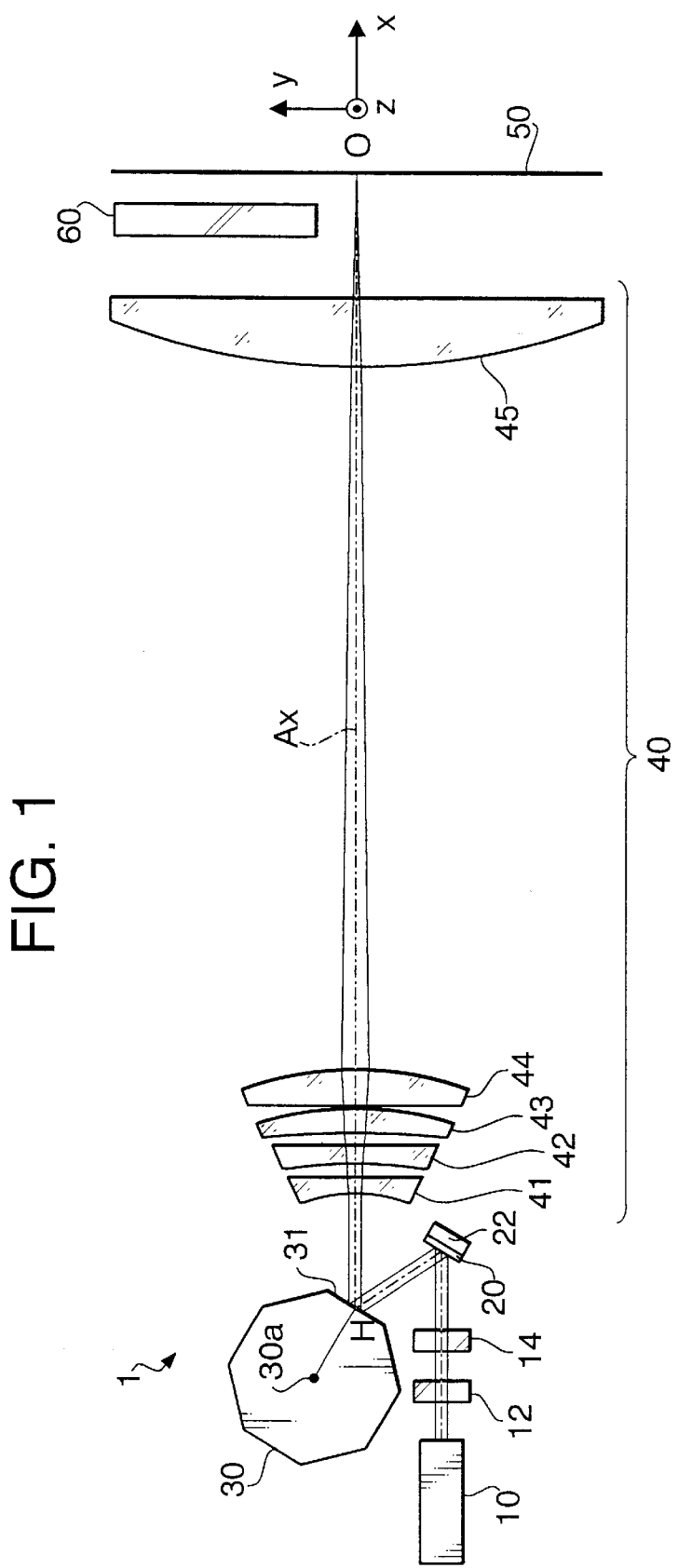
FIG. 1 shows a plan view of a scanning optical system according to an embodiment of the present invention.
Figure 3A:
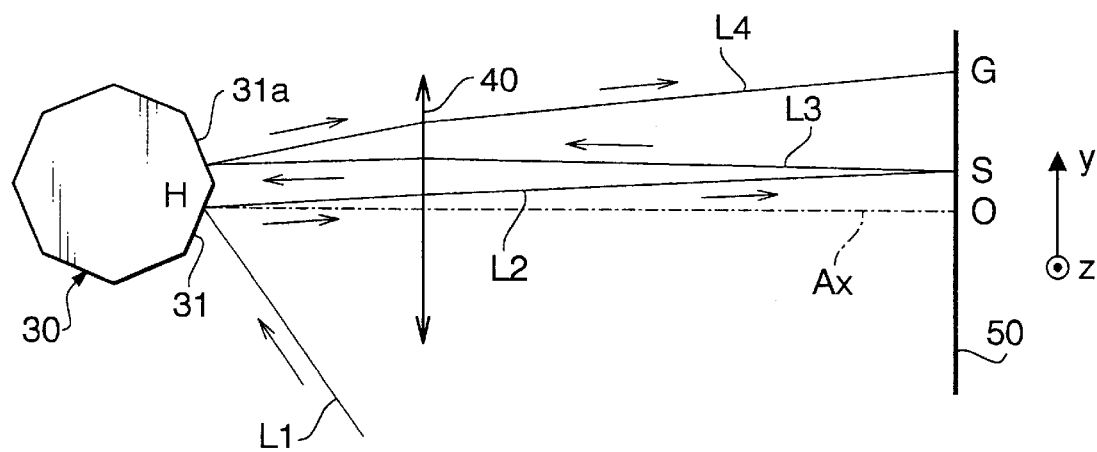
Figure 3B:
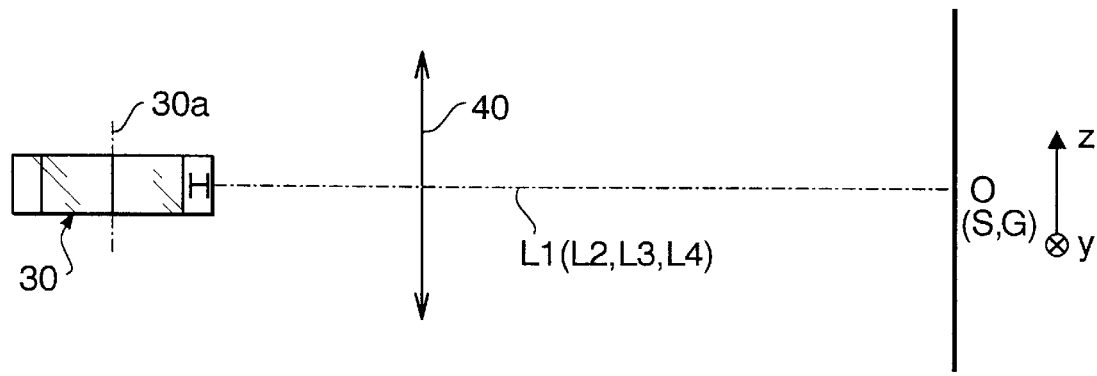
Figure 4A:
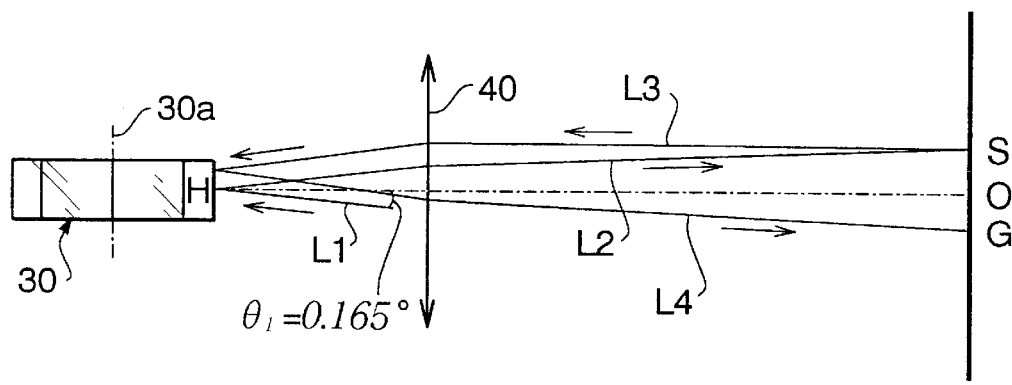
Figure 4B:
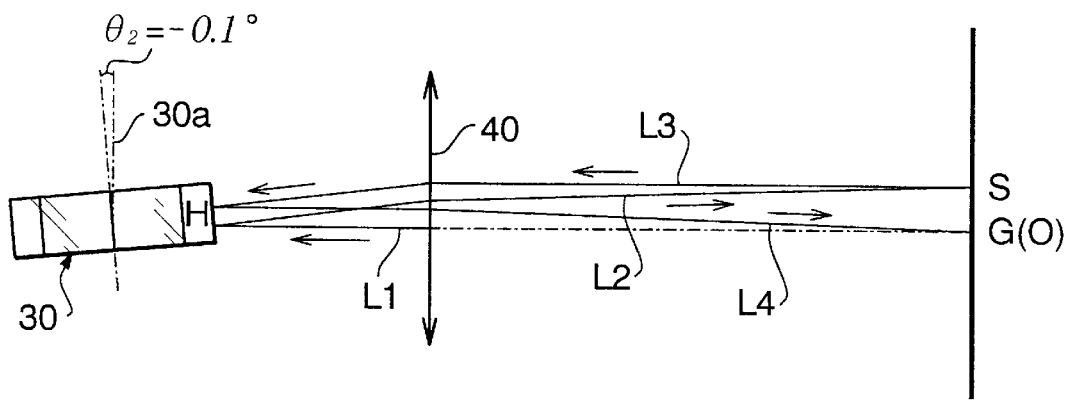
Figure 4C:
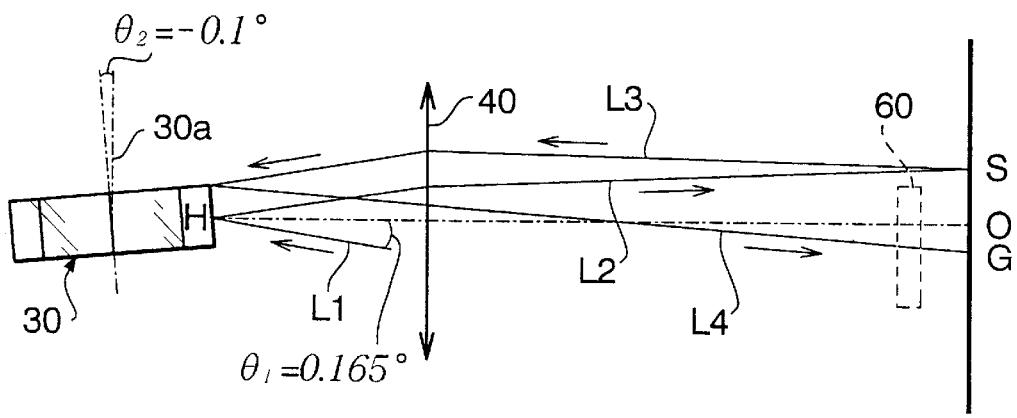
Figure 5A:
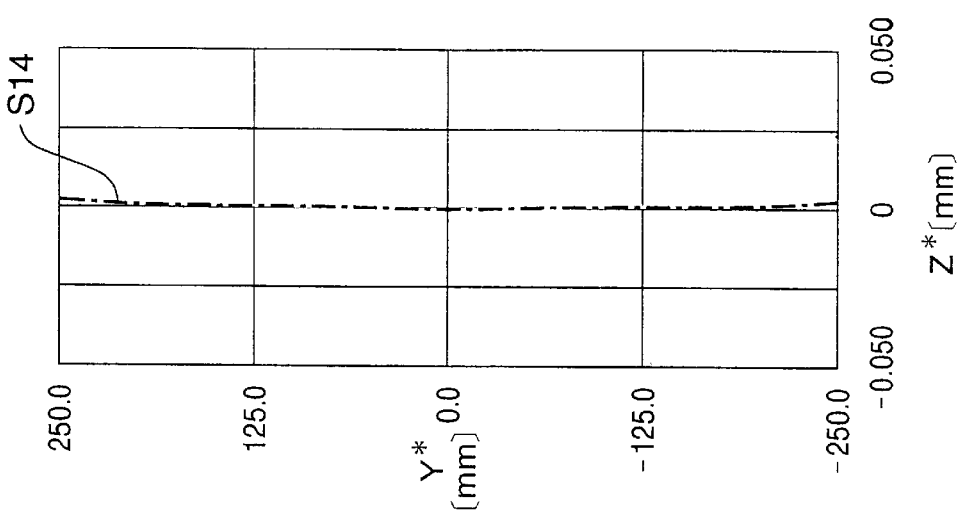
Figure 5B:
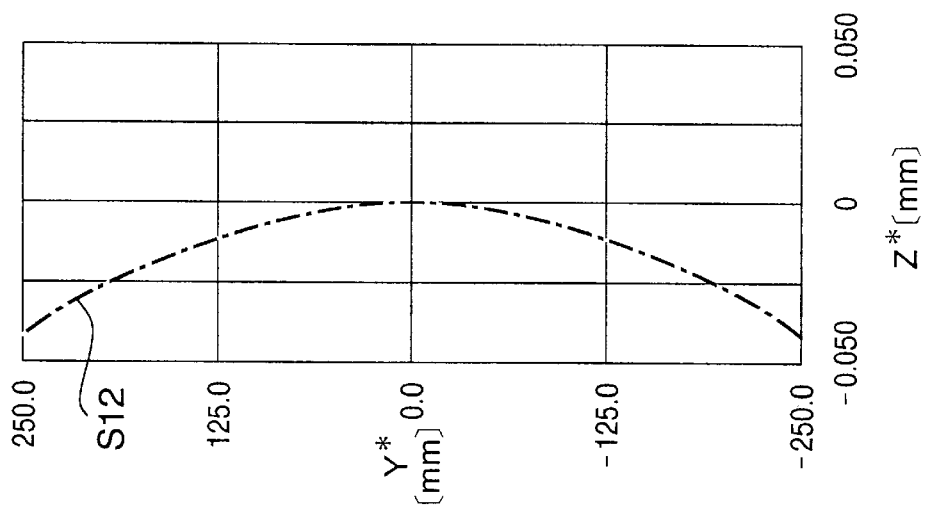
Figure 5C:
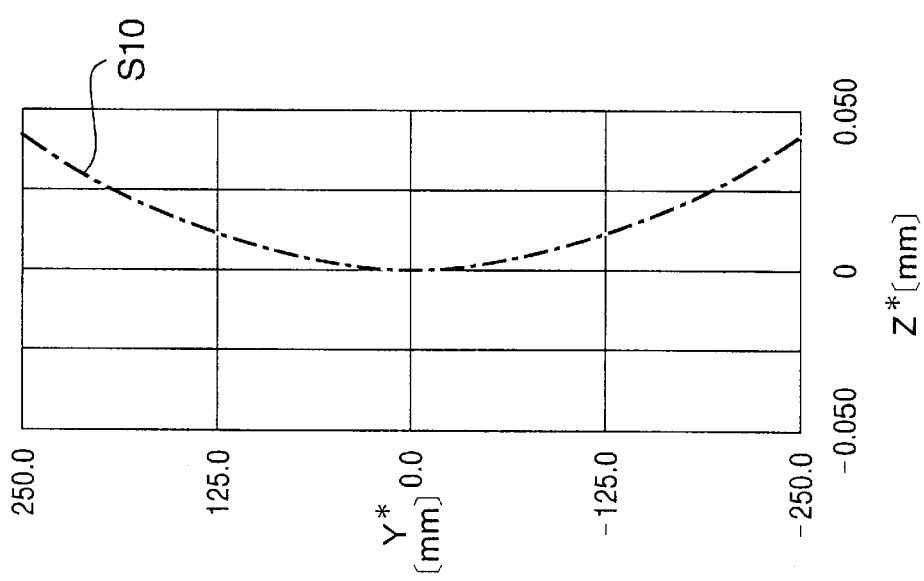

FIGS. 3A and 3B schematically show a plan view and a side view, respectively, of a comparative configuration of a scanning optical system corresponding to that shown in FIG. 1 with a light passage of the laser beam;

FIGS. 4A and 4B schematically show side views of a comparative configuration of a scanning optical system corresponding to that shown in FIG. 1 with a light passage of the laser beam, and FIG. 4C schematically shows a side view of the scanning optical system shown in FIG. 1 with a light passage of the laser beam;

FIG. 5A shows a configuration of a scan line, along which a beam spot moves as a polygonal mirror rotates, when only a laser beam incident on the polygonal mirror is inclined with respect to a main scanning plane;

FIG. 5B shows the scan line when only a rotation axis of the polygonal mirror is inclined with respect to an auxiliary direction; and FIG. 5C shows the scan line when both the laser beam incident on the polygonal mirror and the rotation axis of the polygonal mirror are inclined with respect to the main scanning plane and the auxiliary direction.

DETAILED DESCRIPTION OF THE EMBODIMENTS

Hereinafter, a scanning optical system according to an embodiment of the present invention will be described with reference to the accompanying drawings.

Figure 2:
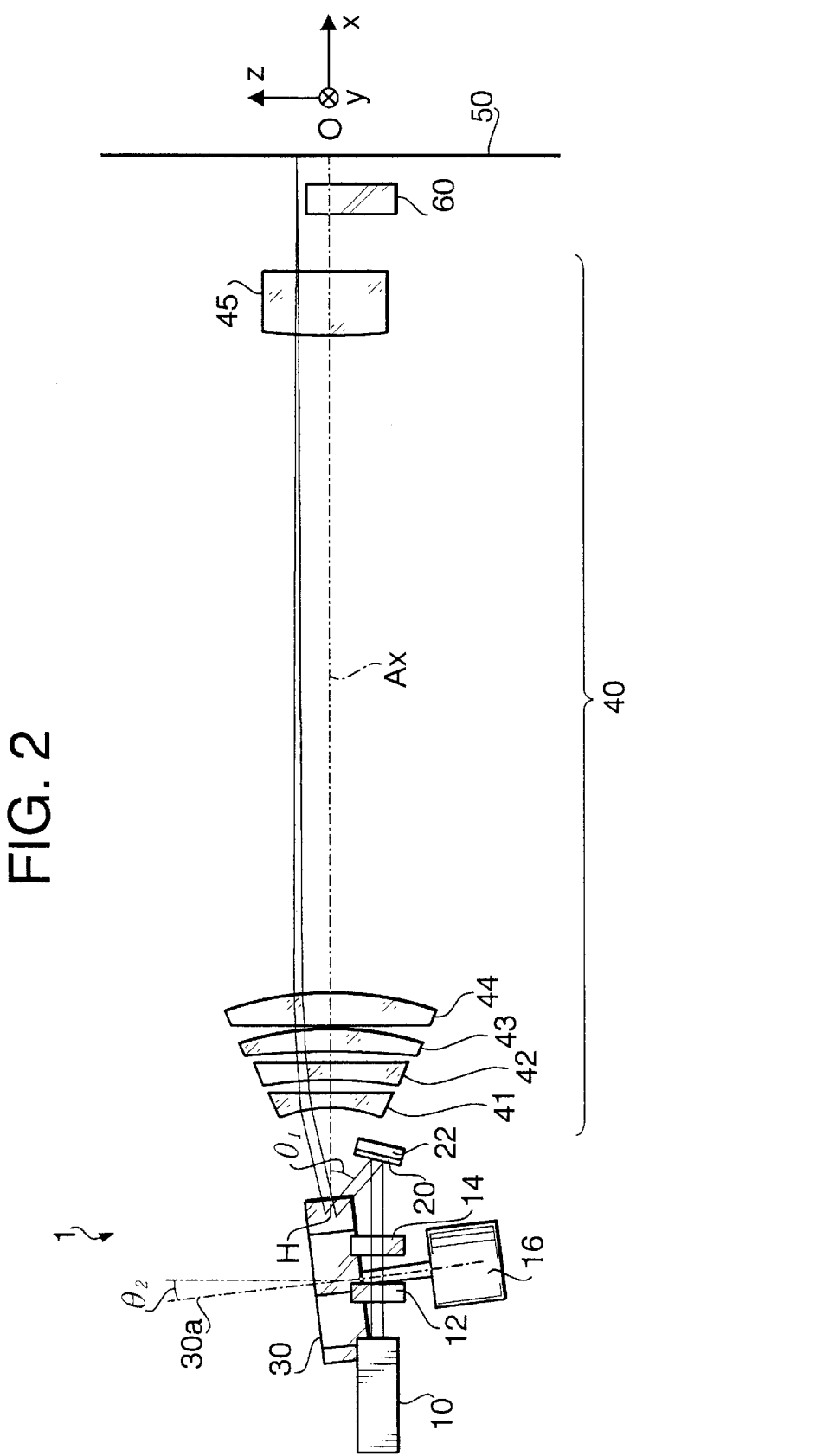
FIG. 2 shows a slide view of the scanning optical system of FIG. 1.

FIG. 1 shows a plan view of a scanning optical system 1 according to an embodiment of the present invention, and FIG. 2 shows a side view of the scanning optical system 1 shown in FIG. 1.

For indicating directions, an XYZ rectangular coordinate system is introduced. An arrow Y in FIG. 1 indicates a scanning direction of a beam spot formed on an object surface 50. The direction Y will be referred to hereinafter as a "main scanning direction". An arrow Z in FIG. 2 indicates a direction perpendicular to the main scanning direction, which will be referred to hereinafter as an "auxiliary scanning direction".

A plane parallel to the main scanning direction Y, i.e., perpendicular to the surface of FIG. 2 and including an optical axis Ax of a fθ lens system 40, which will be described later, will be referred to as a "main scanning plane". Further, a plane perpendicular to the main scanning direction Y, i.e., perpendicular to the surface of FIG. 1 and including the optical axis Ax will be referred to as an "auxiliary scanning plane".

The scanning optical system 1 is provided with a laser source 10 as a light source, a mirror 20 of which a tilt angle is controlled by a piezo-actuator 22, a polygonal mirror 30 rotatable about its rotation axis 30a, and an fθ lens system 40 as a scanning lens system.

The polygonal mirror 30 is provided on its periphery with a plurality of reflecting surfaces 31. Each reflecting surface 31 is arranged parallel to the rotation axis 30a and deflects the laser beam emitted from the laser source 10 toward the fθ lens system 40.

The fθ lens system 40 is disposed between the polygonal mirror 30 and the object surface 50 such that its optical axis Ax is perpendicular to the object surface 50. The fθ lens system 40 converges the laser beam deflected by the polygonal mirror 30 on the object surface 50 to form a beam spot thereon. The fθ lens system 40 consists of lenses (41–45) having rotationally-symmetrical surfaces with respect to the optical axis Ax.

A light intercepting member 60 for preventing the object surface from being exposed to light coming from the fθ lens system 40 is provided between the fθ lens system 40 and the object surface 50. The light intercepting member 60 is disposed, with respect to the main scanning direction Y, on the opposite side of the optical axis Ax to the side from which the laser beam from the laser source is incident on the polygonal mirror 30. The light intercepting member 60 is disposed, with respect to the auxiliary direction Z, lower than the light passage of the laser beam that forms the beam spot on the object surface 50.

The laser beam emitted from the laser source 10 impinges on the mirror 20 after being expanded by a beam expander 12 and modulated by a modulator 14. Then the laser beam is reflected by the mirror 20 towards the reflecting surfaces 31 of the polygonal mirror 30. The polygonal mirror 30 is rotated by a motor 16 about the rotation axis 30a at a constant angular velocity. The angle of the mirror 20 to the incident laser beam is controlled by the piezo actuator 22 in order to compensate for the deviation of the position of the beam spot on the object surface 50 due to the facet error of each reflecting surface 31. The laser beam reflected by the mirror 20 is then deflected by the reflecting surface 31, and transmitted through the fθ lens system 40. Thus, the beam spot formed on the object surface 50 moves at a constant linear velocity in the main scanning direction Y.

The fθ lens system 40 of the present embodiment includes first through fifth lenses 41–45. Both the front side surface (the surface on the polygonal mirror side) and rear side surface (the surface on the object surface side) of each of the lenses 41–45 are formed rotationally-symmetrically with respect to the optical axis Ax of the fθ lens system 40.

Table 1 shows exemplary numerical data of the fθ lens system 40.

TABLE 1

| Surface No. | R [mm] | D [mm] | N |
|---|---|---|---|
| 1 | −177.111 | 20.000 | 1.59124 |
| 2 | −1971.815 | 14.850 | |
| 3 | −492.413 | 20.000 | 1.52177 |
| 4 | ∞ | 13.642 | |
| 5 | −1378.212 | 30.490 | 1.80593 |
| 6 | −321.245 | 2.000 | |
| 7 | 3324.215 | 40.000 | 1.80593 |
| 8 | −403.262 | 824.022 | |
| 9 | 887.449 | 80.000 | 1.52177 |
| 10 | ∞ | | |

In Table 1, symbols R, D, and N represent a radius of curvature of each lens surface, a distance between lens surfaces along the optical axis Ax, and a refractive index of each lens, respectively.

The surface number is given to each surface of each lens in order from the front side surface of lens 41 to the rear side surface of the lens 45. For example, the surface No. 1 indicates the front side surface of the lens 41, surface No. 2 indicates the rear side surface of the lens 41, and the surface No. 10 indicates the rear side surface of the lens 45.

The lens surfaces Nos. 4 and 10, having an infinite radius of curvature, are planar surfaces, while the others (i.e., surfaces Nos. 1 through 3, and 5 through 9) are spherical surfaces.

In addition to the data indicated in Table 1, the focal length of the entire fθ lens system 40 in the main scanning direction, and the focal length in the auxiliary scanning direction are both 699.52 mm, the distance from the reflecting surface 31 of the polygonal mirror 30 to the front side surface of the lens 41 (i.e., surface No. 1) is 132.313 mm, and the distance from the rear side surface of the lens 45 (i.e., surface No. 10) to the object surface 50 is 134.195 mm.

As shown in FIG. 2, the laser beam reflected by the mirror 20 is incident on the reflecting surface 31 at point H where the optical axis Ax intersects with the reflecting surface 31. The laser light source 10 and the mirror 20 are arranged such that the laser beam is incident on point H from a lower side of the main scanning plane at an angle θ1 to the main scanning plane. In the present embodiment, the angle θ1 is 0.165 degrees in the clockwise direction in FIG. 2.

The polygonal mirror 30 is arranged such that its rotation axis 30a is inclined with respect to the auxiliary scanning direction Z, in the counterclockwise direction in FIG. 2, at an angle θ2 which is 0.1 degrees in the present embodiment. In other words, the polygonal mirror 30 is inclined in the direction opposite to the direction in which the laser beam incident on the polygonal mirror 30 is inclined.

The reason why both the laser beam incident on the polygonal mirror 30 and the rotation axis 30a of the polygonal mirror 30 are inclined as above is described hereinafter.

FIGS. 3A and 3B schematically show a plan view and a side view of a comparative configuration of a scanning optical system corresponding to that shown in FIG. 1 with a light passage of the laser beam under the condition of θ1=0° and θ2=0°, i.e., when the laser beam incident on the polygonal mirror 30 is not inclined with respect to the main scanning plane, and the rotation axis 30a of the polygonal mirror is not inclined with respect to the auxiliary scanning direction Z.

As shown in FIG. 3A, the laser beam L1, which is incident on the polygonal mirror 30, is deflected by the reflecting surface 31 and proceeds toward the fθ lens system 40 as a beam L2. The laser beam L2 is transmitted through the fθ lens system 40, is converged by the fθ lens system 40, and then forms a beam spot S on the object surface 50.

A part of the laser beam L2 that forms the beam spot S is scattered on the object surface 50 and transmitted through the fθ lens system 40 back to the polygonal mirror 30 (as a laser beam L3). The laser beam L3 is then reflected by the reflecting surface 31a which is disposed next to the reflecting surface 31. A laser beam L4, which is reflected by the reflecting surface 31a is transmitted again through the fθ lens system 40 and directed toward the object surface 50, and forms a ghost image G thereon. The laser beams L2, L3, and L4 proceed along the main scanning plane, since the laser beam L1 proceeds on the main scanning plane, and the rotation axis 30a of the polygonal mirror 30 is arranged perpendicular to the main scanning plane such that the reflecting surfaces 31 are also perpendicular to the main scanning plane. Accordingly, the ghost image is formed on a scan line, which is defined as a line along which the beam spot S moves as the polygonal mirror 30 rotates.

FIGS. 4A and 4B schematically show side views of a comparative configuration of a scanning optical system corresponding to that shown in FIG. 1 with the light passage of the laser beam. FIG. 4C schematically shows a side view of the scanning optical system shown in FIG. 1 with a light passage of the laser beam.

In FIG. 4A, the laser beam incident on the polygonal mirror 30 is inclined with respect to the main scanning plane in the clockwise direction by 0.165 degrees (θ1=0.165°), while the rotation axis 30a of the polygonal mirror 30 is kept perpendicular to the main scanning plane (θ2=0°). In FIG. 4B, the rotation axis 30a of the polygonal mirror 30 is inclined in the counterclockwise direction with respect to the auxiliary scanning direction Z by 0.1 degrees (θ2=−0.1°), while the laser beam incident on the polygonal mirror 30 is kept parallel to the main scanning plane. Further, in FIG. 4C, the laser beam incident on the polygonal mirror 30 is inclined with respect to the main scanning plane in the clockwise direction by 0.165 degrees (θ1=0.165°), and the rotation axis 30a of the polygonal mirror 30 is inclined with respect to the auxiliary scanning direction Z in counterclockwise direction by 0.1 degree (θ2=−0.1°). Note that angles θ1 and θ2 are positive in the clockwise direction of FIGS. 4A through 4C.

In either case shown in FIGS. 4A through 4C, the polygonal mirror 30 reflects the incident laser beam slightly upward and the beam spot S is formed at a position higher than the main scanning plane. On the contrary, the laser beam scattered by the object surface 50 and transmitted back to the polygonal mirror 50 is a component that is reflected downwardly by the polygonal mirror 50, and the scattered component forms the ghost image G on the object surface 50 at a position lower than the beam spot S. In other words, the position of the beam spot S and the ghost image G are separated in the auxiliary scanning direction Z by inclining the laser beam incident on the polygonal mirror 30 and/or the rotation axis 30a of the polygonal mirror 30.

Table 2 shows amounts of displacement of the beam spot S and the ghost image G from the main scanning plane in the auxiliary direction Z, and the distance between the beam spot S and the ghost image G in the auxiliary scanning direction Z, when the inclination angles of the laser beam incident on the polygonal mirror 30 and the rotation axis of the polygonal mirror are θ1 and θ2, respectively.

TABLE 2

| θ1 [°] | θ2 [°] | Displacement of the beam spot S [mm] | Displacement of the ghost image G [mm] | Distance between the beam spot S and the ghost image G [mm] |
|---|---|---|---|---|
| 0.000 | 0.000 | 0.000 | 0.000 | 0.000 |
| +0.165 | 0.000 | 2.015 | −2.015 | 4.030 |
| 0.000 | −0.1 | 1.737 | 0.000 | 1.737 |
| +0.165 | −0.1 | 3.752 | −2.015 | 5.767 |

As shown in Table 2, when the laser beam incident on the polygonal mirror 30 is inclined in clockwise direction by 0.165 degrees with respect to the main scanning plane while the rotation axis 30a of the polygonal mirror 30 is not inclined, like the case shown in FIG. 4A, the beam spot S is displaced upwardly from the main scanning plane by 2.015 mm, and the ghost image G is displaced downwardly from the main scanning plane by 2.015 mm.

When the rotation axis 30a of the polygonal mirror 30 is inclined in counterclockwise direction by 0.1 degree with respect to the auxiliary scanning direction Z while the laser beam incident on the polygonal mirror 30 is not inclined, like the case shown in FIG. 4B, the beam spot S is displaced upwardly from the main scanning plane by 1.737 mm, but the ghost image G is not displaced from where the main scanning plane intersects the object surface 50.

Further, when the laser beam incident on the polygonal mirror 30 and the rotation axis 30a of the polygonal mirror 30 are inclined simultaneously, that is, θ1 and θ2 are set to +0.165 degrees and −0.1 degrees, respectively, the displacement of the beam spot S becomes equal to the sum of the displacements of the beam spot S in the above mentioned two cases. The displacement of the ghost image G also becomes equal to the sum of the displacements of the ghost image G in the above mentioned two cases. Thus, the ghost image G is separated in the auxiliary direction Z from the beam spot S at the greatest distance in this case.

The large separation of the ghost image G and the beam spot S allows the light intercepting member 60 to disposed below the light passage of the laser beam L2, that forms the beam spot S, but on the light passage of the laser beam L4, as is shown in FIG. 4C in broken lines, so as to prevent the laser beam L4 from impinging on the object surface 50 and forming the ghost image G thereon.

FIGS. 5A though 5C show scan lines along which the beam spot S moves as the polygonal mirror 30 rotates. In FIGS. 5A through 5C, the Y* and Z* coordinate axes are taken parallel to the main scanning direction Y and the auxiliary scanning direction Z, respectively. The intersection point between the scan line and the auxiliary scanning plane is taken as the origin of both Y* and Z* coordinates.

FIG. 5A shows the scan line that appears on the object surface 50 when only the laser beam incident on the polygonal mirror 30 is inclined by θ1=+0.165°, which is the case shown in FIG. 4A. In this case, the scan line S10 bows such that its center protrudes toward the negative direction of Z* coordinate axis (downward direction in FIG. 4A). FIG. 5B shows the scan line S12 that appears when only the rotation axis 30a of the polygonal mirror 30 is inclined by θ2=−0.1°, which is the case shown in FIG. 4B. In this case, the scan line S12 bows such that its center protrudes toward the positive direction of Z* coordinate axis (upward direction in FIG. 4B). The deviation in the Z* axis direction of the scan line S20 (the distance between the top and the bottom in Z* axis direction) is substantially the same as that of the scan line S10. Such a bow of the scan line is undesirable since it significantly degrades the quality of the image formed on the object surface 50. Therefore, the scanning optical systems shown in FIG. 4A or 4B, i.e., by which only one of the rotation axis of the polygonal mirror and the laser beam incident on the polygonal mirror is inclined, are not suitable for a laser imaging device such as a laser plotter, for example, that requires high image quality.

FIG. 5C shows the scan line that appears when the laser beam and the rotation axis 30a are inclined by θ1=+0.165° and θ2=−0.1°, respectively, which is the case shown in FIG. 4C. In this case, the scan line becomes a substantially straight line since the bow caused by the inclination of the laser beam incident on the polygonal mirror 30 is canceled by the bow caused by the inclination of the rotation axis 30a of the polygonal mirror 30. Thus, the quality of the image formed on the object surface 50 is not degraded by the bow of the scan line.

As described above, the scanning optical system 1 according to the embodiment of the present invention inclines the laser beam incident on the polygonal mirror 30 with respect to the main scanning plane, and also the rotation axis 30a of the polygonal mirror 30 with respect to the auxiliary scanning direction Z such that the ghost image G appears on the object surface 50 apart from the beam spot S in the auxiliary direction Z. Thus the ghost image does not degrade the image formed on the scan line by the beam spot.

By the scanning optical system of the present embodiment, the displacement of the beam spot S and the ghost image G in the auxiliary scanning direction is not a function of the number of the reflecting mirrors 31 provided to the polygonal mirror 30. Therefore, the scanning optical system of the present invention successfully separates the position of the beam spot S and the ghost image S even in the case the number of the reflecting mirrors is quite large.

Though the laser beam incident on the polygonal mirror 30, and the rotation axis 30a of the polygonal mirror 30 are inclined with respect to the main scanning plane and the auxiliary scanning direction Z, respectively, no bow appears in the scan line along which the beam spot moves, since the amount and direction of the inclinations are selected such that the bow due to the inclination on the laser beam cancels the bow due to the inclination of the rotation axis 30a. Accordingly, no degradation of quality occurs in the image formed on the object surface 50 by the scanning optical system according to the embodiment of the present invention.

The present disclosure relates to the subject matter contained in Japanese Patent Application No. 2000–202264, filed on Jul. 4, 2000, which is expressly incorporated herein by reference in its entirely.

What is claimed is:

1. A scanning optical system for scanning a light beam on an object surface in a main scanning direction, comprising:
   a light source for emitting the light beam;
   a polygonal mirror rotating about an rotation axis, said polygonal mirror having a plurality of reflecting surfaces arranged parallel to the rotation axis, said reflecting surfaces deflecting the light beam emitted from said light source toward the object surface to scan the light beam in the main scanning direction; and
   a scanning lens system for converging the light beam deflected by said reflecting surfaces on the object surface to form a beam spot thereon, a focal length of said scanning lens system in a main scanning direction is the same as a focal length of said scanning lens system in an auxiliary scanning direction, the auxiliary scanning direction being perpendicular to both the main scanning direction and an optical axis of said scanning lens system,
      wherein a projection of the light beam incident on said reflecting surfaces onto an auxiliary scanning plane, which is perpendicular to the main scanning direction, inclines against the optical axis in a first direction, and
      wherein a projection of the rotation axis of said polygonal mirror onto the auxiliary scanning plane inclines against the auxiliary scanning direction, in a second direction which is opposite to said first direction.

2. The scanning optical system according to claim 1, further comprising:
   a light intercepting member provided on a passage of light forming a ghost image on the object surface, but out of a passage of the light beam forming the beam spot on the object surface.

3. The scanning optical system according to claim 1, wherein the projection of the light beam incident on said reflecting surface onto the auxiliary scanning plane and the projection of the rotation axis of said polygonal mirror onto the auxiliary plane are inclined, respectively, such that a bow of a scan line, along which the light beam moves as said polygonal mirror rotates, caused by the inclination of the rotation axis of the polygonal mirror is canceled by a bow of the scan line caused by the inclination of the light beam incident on said reflecting surface.

4. A scanning optical system for scanning a light beam on an object surface in a main scanning direction, comprising:
   a light source for emitting the light beam;
   a polygonal mirror rotating about an rotation axis, said polygonal mirror having a plurality of reflecting surfaces arranged parallel to the rotation axis, said reflecting surfaces deflecting the light beam emitted from said light source toward the object surface to scan the light beam in the main scanning direction; and
   a scanning lens system for converging the light beam deflected by said reflecting surfaces on the object surface to form a beam spot thereon, a focal length of said scanning lens system in the main scanning direction is the same as a focal length of said scanning lens system in an auxiliary scanning direction, the auxiliary scanning direction being perpendicular to both the main scanning direction and an optical axis of said scanning lens system,
      wherein a projection of the light beam incident on said reflecting surfaces onto an auxiliary scanning plane, which is perpendicular to the main scanning direction, and a projection of the rotation axis of said polygonal mirror onto the auxiliary scanning plane are inclined, respectively, against the optical axis and the auxiliary scanning direction such that a part of light of the beam spot is reflected by the object surface, further reflected by said reflecting surface back to the object surface, and forms a ghost image on the object surface on the opposite side, with respect to the optical axis of said scanning lens system, to the side the beam spot is formed.

5. The scanning optical system according to claim 4, further comprising:
   a light intercepting member provided on a passage of a light forming a ghost image on the object surface, but out of a passage of the light beam forming the beam spot on the object surface.

6. The scanning optical system according to claim 4, wherein the projection of the light beam incident on said reflecting surface onto the auxiliary scanning plane and the projection of the rotation axis of said polygonal mirror onto the auxiliary plane are inclined, respectively, such that a bow of a scan line, along which the light beam moves as said polygonal mirror rotates, caused by the inclination of the rotation axis of said polygonal mirror is canceled by a bow of the scan line caused by the inclination of the light beam incident on said reflecting surface.

7. A scanning optical system for scanning a light beam on an object surface in a main scanning direction, comprising:
   a light source for emitting the light beam;
   a polygonal mirror rotating about an rotation axis, said polygonal mirror having a plurality of reflecting surfaces arranged parallel to the rotation axis, said reflecting surfaces deflect the light beam emitted from said light source toward the object surface to scan the light beam in the main scanning direction; and
   a scanning lens system for converging the light beam deflected by said reflecting surfaces on the object surface to form a beam spot thereon, a focal length of said scanning lens system in the main scanning direction is the same as a focal length of said scanning lens system in an auxiliary scanning direction, the auxiliary scanning direction being perpendicular to both the main scanning direction and an optical axis of said scanning lens system,
      wherein said rotation axis is inclined with respect to the auxiliary scanning direction to displace the beam spot in the auxiliary scanning direction, and
      wherein the light beam incident on one of said reflecting surfaces is inclined with respect to a main scanning plane to displace the beam in a direction, along said auxiliary scanning direction, which is the same as a direction in which the beam spot is displaced due to the inclination of the rotation axis, the main scanning plane is parallel to the main scanning direction and including the optical axis of said scanning lens system.

8. The scanning optical system according to claim 7, wherein the rotation axis of said polygonal mirror and the light beam incident on one of said reflecting surfaces are inclined with respect to the auxiliary scanning direction and the main scanning plane, respectively, such that a bow of a scan line, along which the light beam moves as said polygonal mirror rotates, caused by the inclination of the rotation axis of said polygonal mirror is canceled by a bow of the scan line caused by the inclination of the light beam incident on the reflecting surface.

9. The scanning optical system according to claim 7, further comprising a light intercepting member provided on a passage of a light forming a ghost image on the object surface, said light intercepting member being disposed apart in the auxiliary scanning direction from a passage of the light beam for forming the beam spot.

* * * * *